(12) United States Patent
Quetel et al.

(10) Patent No.: US 8,662,872 B2
(45) Date of Patent: Mar. 4, 2014

(54) OVEN FOR THE THERMAL CONDITIONING OF PREFORMS MADE OF A THERMOPLASTIC MATERIAL

(75) Inventors: Francois Quetel, Octeville sur Mer (FR); Jerome Demare, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 511 days.

(21) Appl. No.: 13/125,427

(22) PCT Filed: Oct. 13, 2009

(86) PCT No.: PCT/EP2009/063308
§ 371 (c)(1),
(2), (4) Date: Apr. 21, 2011

(87) PCT Pub. No.: WO2010/046270
PCT Pub. Date: Apr. 29, 2010

(65) Prior Publication Data
US 2011/0203579 A1  Aug. 25, 2011

(30) Foreign Application Priority Data
Oct. 22, 2008 (FR) ..................................... 08 57164

(51) Int. Cl.
*B29C 49/68* (2006.01)

(52) U.S. Cl.
USPC ............................. 425/73; 425/210; 425/526

(58) Field of Classification Search
CPC ................ B29C 2049/4679; B29C 2049/4682
USPC ............................. 425/73, 210, 526, 533, 534
See application file for complete search history.

(56) References Cited

U.S. PATENT DOCUMENTS

| 4,606,723 A | 8/1986 | Pasternicki |
| 5,322,651 A * | 6/1994 | Emmer ........................ 264/410 |
| 5,714,109 A | 2/1998 | Diller |

(Continued)

FOREIGN PATENT DOCUMENTS

| CA | 1 010 212 A1 | 5/1977 |
| EP | 0 593 033 A1 | 4/1994 |

(Continued)

OTHER PUBLICATIONS

International Search Report, date Jan. 21, 2010, from corresponding PCT application.

*Primary Examiner* — Robert B Davis
(74) *Attorney, Agent, or Firm* — Young & Thompson

(57) ABSTRACT

An oven (10) for the thermal conditioning of preforms made of a thermoplastic material, includes at least one cooling circuit (6) with air flow circulation which sequentially extends from the upstream side to the downstream side through at least one cooling air intake area (16*a*), a heating area (16*b*) in which a preform heating element (22) and the cooling air flow projected by ventilation elements are provided, and an air extraction area (16*c*) to which at least one air extraction duct (42) is connected, characterized in that the oven includes a confining housing that extends from the air extraction duct to at least the heating area, and is capable of insulating at least the heating area from the outside of the oven in order to prevent the pollution of the inside of the oven by airborne pollution particles.

16 Claims, 2 Drawing Sheets

(56) References Cited

U.S. PATENT DOCUMENTS

| | | |
|---|---|---|
| 6,562,281 B1 | 5/2003 | Marchau et al. |
| 6,632,087 B1 | 10/2003 | Armellin et al. |
| 8,167,601 B2 * | 5/2012 | Matsushita et al. ............ 425/73 |
| 8,257,073 B2 * | 9/2012 | Quetel et al. ................... 425/73 |
| 2007/0085243 A1 | 4/2007 | Doudement |
| 2009/0317506 A1 * | 12/2009 | Adriansens .................. 425/103 |
| 2013/0078327 A1 * | 3/2013 | Adriansens .................. 425/210 |

FOREIGN PATENT DOCUMENTS

| | | |
|---|---|---|
| EP | 1 699 613 B1 | 8/2008 |
| FR | 2 561 986 A1 | 10/1985 |
| FR | 2 766 121 A1 | 1/1999 |

* cited by examiner

OVEN FOR THE THERMAL CONDITIONING OF PREFORMS MADE OF A THERMOPLASTIC MATERIAL

The invention relates to an oven for the thermal conditioning of preforms made of a thermoplastic material.

The invention relates more particularly to an oven for the thermal conditioning of preforms made of a thermoplastic material which comprises at least one cooling circuit using the circulation of a main flow of cooling air which, from the upstream side to the downstream side, sequentially traverses inside the oven at least:

one cooling air intake area, which comprises at least one air intake duct through which the said flow of cooling air can flow, from the outside of the oven to the inside of the oven, one heating area which is supplied with air by the intake duct and which comprises means for heating the preforms, and one air extraction area into which at least one air extraction duct opens.

The production of containers, such as flasks, bottles etc., made of thermoplastic material, for example PET (polyethylene terephthalate), is generally carried out from preforms obtained by injection molding.

Such preforms are conditioned thermally beforehand in an oven so as to enable them to be converted, in particular by blow molding or by stretch blow molding, into a hollow-bodied container.

The preforms are generally shaped like a test tube mainly comprising a body of varying length and a neck which already has its final shape. Indeed, the neck of the preform forms the neck of the container and has, for example, a thread intended to receive a screw top.

Before carrying out the blow molding operation, it is necessary to heat the body of the preforms to a temperature above their glass transition temperature without, however, damaging or "burning" the outer surface, or skin, of the body of the preforms.

To this end, a type of heating oven is known for the thermal conditioning of preforms, such as that described in the document EP-A1-1 699 613, which comprises a cooling circuit provided with suitable ventilation means for obtaining a cooling by the circulation of a flow of air.

The cooling circuit of such an oven mainly comprises a first cooling air intake area, a second intermediate heating area equipped with means for heating the preforms, for example infrared radiation (IR) lamps, and a third area for the extraction of the air after it has been heated as it passed through the second area.

The areas are, for example, built into the interior of the oven and are arranged in such a way that the extraction in the third area is generally carried out in the top or upper part of the oven, the heating area being interposed between the said first and third area.

As described in the document EP-A1-1 699 613, the intake of air is carried out laterally. Other arrangements are, however, possible, for example such as the intake taking place in the bottom part.

The function of the cooling circuit, using the circulation of air, of such an oven is to mitigate the effects of thermal conduction through the mass of air contained in the oven and to make maximum use of the infrared radiation of the heating means, in order to optimally heat the thickness of the body of the preforms without burning their outer surface, known as the "skin". This makes it possible to prevent any damage to the said skin of the preforms but also to maintain the environment of the heating area below temperatures which are likely to affect the mechanical members situated there, such as, for example, the caps of the infrared radiation lamps.

The ventilation means comprise, for example, at least one centrifugal fan which draws the air in from outside the oven, through the intake area, and which blows the drawn-in air toward the preforms so as to stir the hot air inside the heating area of the oven, in particular in the vicinity of the preforms.

Owing to the circulation of the flow of cooling air, optimum use is made of the infrared radiation, which makes it possible to bring the body of the preform to the desired temperature in a homogeneous fashion over the thickness of the wall of the body, without damaging the outer surface of the body of the preforms or softening the neck of the preforms.

The oven generally also comprises protection means which can protect the necks of the preforms from the infrared radiation, as well as means for cooling the necks and which consist, for example, of part of the said flow of cooing air and/or additional cooling means, in particular using the circulation of air.

In a complementary fashion, the extraction area of the oven comprises extraction means associated with the said extraction duct, such as an air extraction hood which is positioned above the heating area and which is intended to extract the air coming from the heating area of the oven to the outside through the extraction duct, in particular so as to evacuate heat from the oven.

Such extraction means also make it possible to recover and evacuate residual toxic vapor of sterilizing agents when the inside of the preform is decontaminated simultaneously with the thermal conditioning.

Such a decontamination operation is advantageously obtained by the deposition by condensation of a sterilizing agent—such as hydrogen peroxide ($H_2O_2$)—which is intended to be activated thermally in the oven by the heating means and then evacuated in the vaporous state by the air extraction means.

The extraction area and the heating area are arranged vertically one above the other and they are separated from each other by an empty space which is completely open and through which flows the air coming from the heating area, to be captured and then evacuated by the extraction duct.

Indeed, for a person skilled in the art, it is common practice that an oven for thermally conditioning preforms necessarily comprises, whatever its design, such an opening in its upper part so as to enable the cooling air heated after it has traversed the heating area to be evacuated by the extraction means situated directly above, or even naturally by convection to the outside of the oven in the absence of such means.

One of the preoccupations of a person skilled in the art is indeed to control the thermal conditioning of the preforms upon which the quality of the final container obtained is directly dependent and with which the efficiency of the cooling, like that of the heating, is also closely linked.

Another of his preoccupations relates generally to the hygiene and cleanliness of the containers and hence of the preforms which are intended to be converted into containers after heating by blow molding (or stretch blow molding), which containers are then preferably filled directly in an antiseptic environment after they have been produced.

As mentioned above, it is known to sterilize the inside of the preforms using an agent, such as hydrogen peroxide, which evaporates when it is subjected to the heating means of the oven and is then drawn off by the hood.

In a complementary fashion, it is known to decontaminate the outside of the preform, in particular the neck, by irradiating it with ultraviolet radiation.

Lastly, it is known to equip the air intake area of the oven with air filtration means in such a way that the ventilation means blow a filtered air having a specified degree of cleanliness onto the preforms.

However, the control of the quality of the ventilated air by filtration is limited by the efficiency of the filters, in particular for eliminating particles such as micro-organisms of the order of 1 μm in size.

The document U.S. Pat. No. 5,714,109 discloses an oven which aims to insulate the oven from the surrounding air currents and dust. To this end, the oven comprises a duct in which the preforms are arranged with a view to being heated and subjected to a cooling flow. The duct comprises, in particular, an end which allows the cooling air to be evacuated downstream of the preforms. This duct comprises a fan which is arranged upstream of the preforms to circulate the air in the duct.

It has, however, been noted that air leaks could occur upstream of the preform, thus transporting dust into the heating area of the oven.

The object of the invention is, in particular, to further improve the cleanliness of the preforms, and hence of the containers, but without altering the thermal conditioning of the preforms which is performed in the oven.

To this end, the invention proposes to close the air extraction area in order to insulate the inside of the oven, most particularly at least the heating area in which the preforms circulate, with respect to the outer environment of the oven.

Such a closing of the upper opening does, of course, run completely counter to the technical presuppositions of a person skilled in the art who, on the one hand, knows and already implements, alone or in combination, the different sterilization or decontamination solutions and who, on the other hand, would have completely ignored it and never entertained it as such a closing would cause numerous problems for controlling the thermal conditioning.

Amongst such problems, mention can be made of the presumed impossibility of controlling the thermal conditioning satisfactorily by the combined application of the heating and cooling, in particular that such a closing would cause a rise in temperature that could impair the satisfactory thermal conditioning of the preforms and is also likely to damage the mechanical members such as the caps of the lamps.

The document U.S. Pat. No. 5,714,109 is also known which describes and illustrates an oven for the thermal conditioning of preforms made of a thermoplastic material which aims in particular to insulate the oven from the outside currents of air, for example when a door of the factory in which the oven is situated is open.

To this end, the oven comprises a duct in which the preforms are arranged with a view to being heated and subjected to a flow of cooling air.

The duct comprises a first end which is connected to an air-conditioning unit, and a second end which enables the cooling air to be evacuated downstream of the preforms.

The duct also comprises a fan which is arranged upstream of the preforms for circulating the air in the duct.

The invention proposes more particularly an oven of the above-described type, characterized in that the oven comprises a confining housing that extends from the air extraction duct to at least the heating area and is capable of insulating at least the said heating area with respect to the outside of the oven in order to prevent the pollution of the inside of the oven by airborne polluting particles.

By virtue of the confining housing according to the invention, polluting particles are prevented from entering the inside of the oven, in particular the heating area which the preforms traverse, when the oven is operating.

Indeed the applicant has noted that, surprisingly, the opening or empty space which in previously known ovens separated the air extraction area and the heating area was an area which could potentially pollute the inside of the oven since some polluting particles were likely, by passing through this opening, to penetrate as far as the heating area, and this is so despite the ascending flow of air which during operation is drawn off by the hood.

Now there is a risk of such polluting particles being deposited on the preforms, or the mechanical members, and hence polluting the preforms directly or subsequently.

According to other features of the invention:
the intake area comprises filtering means intended to filter the cooling air taken into the said area;
the cooling air intake area comprises means for detecting the accumulation of dirt on the said filtering means;
the confining housing comprises at least one so-called auxiliary air inlet aperture which is arranged downstream of the heating area in such a way that a secondary flow of air flows from outside the oven, directly through the said auxiliary air inlet aperture, to the air extraction duct;
the confining housing comprises at least one so-called upper first part which has a widened shape in the direction of the heating area so as to collect the main flow of air;
the confining housing comprises at least one so-called lower second part which is connected to the first part and which extends around the oven so as to insulate at least the heating area from the outside;
the heating area comprises ventilation means which can draw in the air coming from the intake duct and blow the air drawn in in this way toward the preforms, creating an elevated pressure in the vicinity of the said preforms, such that only the air drawn in by the ventilation means comes into contact with the preforms;
the oven comprises at least:
an air extraction means which is associated with the extraction duct and which can create a suction reduced pressure in the extraction area upstream of the said extraction duct,
a means for measuring the reduced pressure inside the air extraction area,
a means for controlling the air extraction means as a function of parameters that include at least:
the value of the reduced pressure measured inside the air extraction area by the said measuring means, and
a predetermined reference value for the reduced pressure so as to create a reduced pressure inside the air extraction area such that the flow rate of air extracted through the extraction duct is greater than the flow rate of the air blown toward the preforms by the ventilation means in the heating area;
the oven operates in a first so-called production mode in which the heating means are activated, or in a second so-called out-of-production mode in which the heating means are deactivated and, irrespective of the mode in which the oven is operating, the oven is traversed permanently by the main flow of air in order to prevent the deposition of polluting particles inside the oven;
the said predetermined reference value for the reduced pressure varies selectively as a function of the modes of the oven so as to adapt the flow rate of the main flow of air depending on whether the oven is in the first or second mode.

Other features and advantages of the invention, as well as details of design and production, will become apparent on reading the detailed description below which can be understood with reference to the attached drawings, in which.

In the description and the claims, use will be made by convention and with no limitation being implied of the terms "front" or "rear" with reference to the longitudinal direction, "upper" and "lower" with reference to the vertical direction and according to gravity, and the longitudinal, vertical and transverse directions with reference to the axis system (L, V, T) indicated in the Figures.

The expressions "upstream" and "downstream" will also be used with reference to the direction in which the flow of cooling air circulates inside the oven, in other words from the so-called upstream intake area to the so-called downstream extraction area of the oven.

Figure 1:
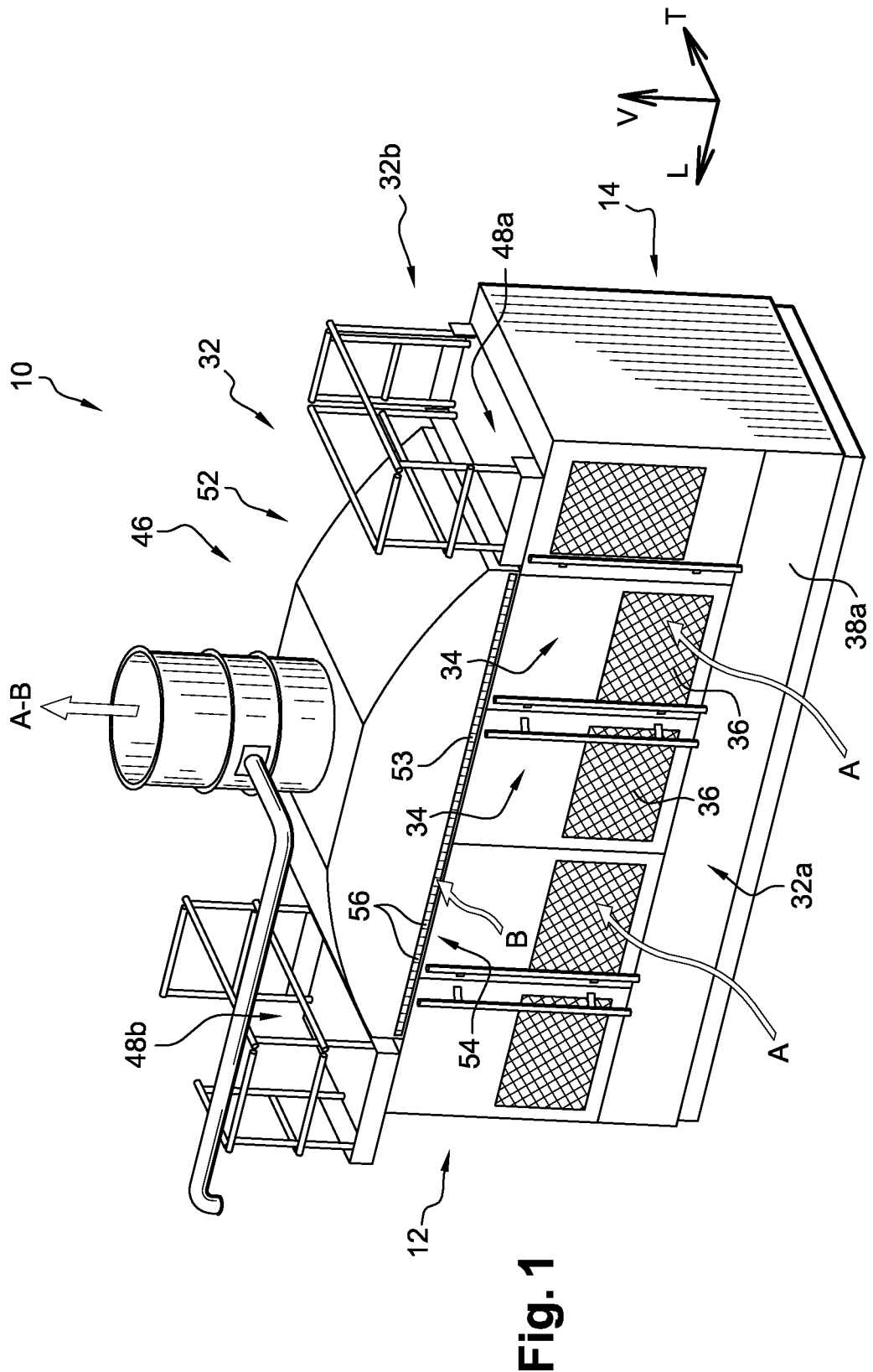
FIG. 1 is a perspective view which shows an oven and which illustrates the arrangement of the confining housing according to the invention for insulating from the outside the cooling circuit of the oven which comprises sequentially an air intake area, a preform heating area and an air extraction area.

An oven 10 is shown in FIG. 1 for the thermal conditioning of preforms (not shown) made of thermoplastic material, for example PET (polyethylene terephthalate).

The oven 10 here comprises, for example, a U-shaped heating path for the preforms, comprising two parallel longitudinal heating sections, one an outward section and the other a return section, joined together by a so-called stabilizing transverse curved section.

The oven 10 is overall shaped like a tunnel which extends longitudinally, from rear to front, from a first rear side 12 to a second, opposite, closed front side 14.

The rear side 12 is open to allow the preforms to pass through. However, it is open in a pressurized area, as will be described below, such that polluting particles cannot penetrate into the oven via this rear side 12.

Figure 2:
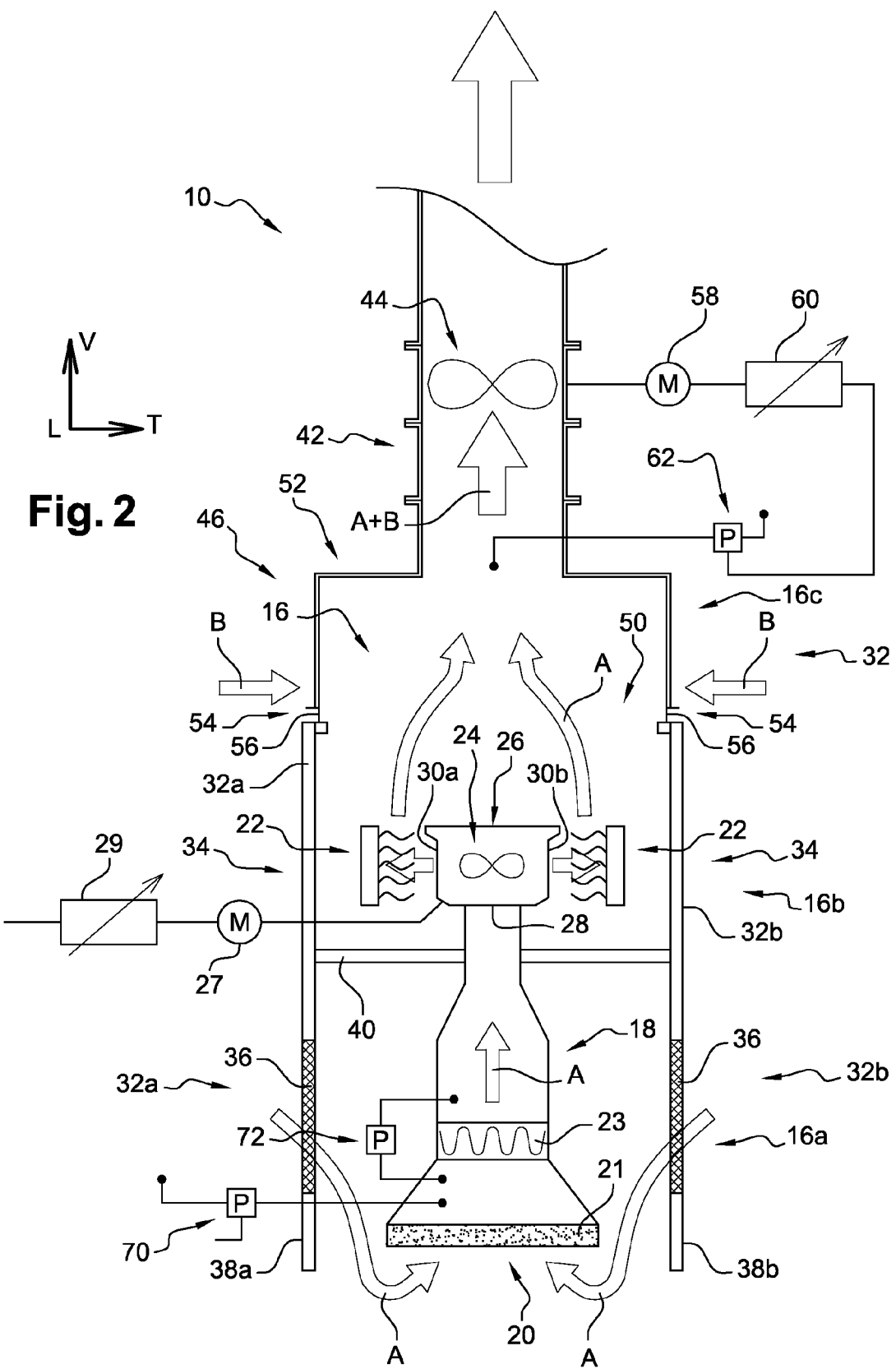
FIG. 2 is a diagrammatic view in cross section which illustrates the flowing, from the upstream side to the downstream side, of the main flow of cooling air through the said areas of the oven, and the flowing of a secondary flow of air.

As can be seen in FIG. 2, the oven 10 is overall symmetrical in design relative to a vertical median plane (not shown) which extends longitudinally passing through the center of the oven 10, and identical elements are designated by the same reference numerals suffixed by "a" or "b".

The oven 10 is only one of the stations of a plant for producing containers, for example bottles, from preforms.

Such a production plant comprises, for example, a device (not shown) for supplying preforms, which supplies the oven 10 with preforms through the rear side 12 of the oven 10.

The preforms are introduced into the oven 10 by transfer means at the rear side 12 where the preforms are taken up by conveying means of the oven 10 in an operation that is also known as "mounting".

The preforms are then carried into the oven 10 by the conveying means (not shown), for example here along a U-shaped heating path.

At the end, the preforms leave the oven 10 through the rear side 12 and are, after having been conditioned thermally by the oven 10, taken up by other transfer means (not shown) in order to convey them directly to a molding device (not shown) with a view to converting them by blow molding or by stretch blow molding into a hollow container.

The means for conveying the preforms are advantageously capable of transporting the preforms along the heating path and comprise support elements (not shown), also sometimes termed "turntables", each of which interact with the inner wall of the neck of each preform.

The support elements of the conveying means are preferably capable of driving each preform in rotation about itself so as to promote a homogeneous and uniform distribution of the heat in the body of each preform.

According to FIG. 2, the oven 10 is traversed by a main flow of air A for cooling the preforms which flows from the upstream side to the downstream side, through the oven 10, and to be more precise here vertically from bottom to top.

As can be seen in FIGS. 1 and 2, the oven 10 essentially comprises a cooling circuit 16 comprising sequentially in the direction of flow of the main flow of air A, an air intake area 16a, also known as the upstream area, a preform heating area 16b and an air extraction area 16c, also known as the downstream area.

The three areas 16a, 16b, 16c are here superposed vertically and the main flow of air A flows sequentially through each area, from bottom to top, in other words also according to a thermal gradient from the coldest area to the hottest area.

Such an arrangement of the areas of the cooling circuit advantageously makes it possible to obtain an oven that has good compactness and to exploit the principle of convection.

The air intake area 16a comprises connection means such as at least one air intake duct 18 through which the main flow of air A flows from the outside of the oven 10 to the inside of the oven 10.

The air intake duct 18 is equipped with an air inlet 20 which opens out vertically toward the bottom of the oven 10.

The air inlet 20 is equipped with means 21, 23 for filtering the drawn-in air such that only filtered air having a specified degree of cleanliness is drawn in and introduced into the intake area 16a of the oven 10.

More precisely, the filtering means comprise at least one first upstream filter 21 and one second downstream filter 23, respectively.

The upstream filter 21 advantageously has a throughflow cross section which is greater than that of the downstream filter 23.

As can be seen in the Figures, the heating area 16b is delimited transversely by a peripheral housing 32.

The peripheral housing 32 comprises at least one so-called lower part comprising a first vertical side wall 32a and a second vertical side wall 32b which are arranged transversely opposite each other and each of which extends longitudinally in order to delimit the heating area 16b transversely between them, inside the oven 10.

Moreover, the heating area 16b is delimited longitudinally at the front by the closed front side 14 and at the rear by the open rear side 12.

Each side wall 32a, 32b of the peripheral housing 32 preferably comprises a plurality of doors 34, five in this case, which allow access to the inside of the oven 10, for example in order to carry out checking or maintenance operations inside the oven 10.

Each door 34 comprises an aeration grille 36 to allow the main flow of air A to flow from the outside of the oven 10 to the intake duct 18.

Each wall 32a, 32b of the peripheral housing 32 comprises a lower plate 38a, 38b respectively for cladding the oven 10, which extends vertically substantially from the bottom of the doors 34 to the ground.

According to FIG. 2, the heating area 16b is delimited vertically at the bottom by a floor 40 through which the vertical intake duct 18 extends.

Lastly, the peripheral housing 32 delimits downstream an upper opening 50 which opens out vertically at the top in order to allow the main flow of air A to flow upward.

The upper opening 50 extends over the entire periphery of the oven 10 longitudinally from the rear side 12 to the front side 14 and transversely between the walls of the housing 32.

The heating area 16b comprises lateral preform heating means 22, for example infrared radiation (IR) lamps which, when activated, irradiate the bodies of the preforms in order to heat them and raise them to a suitable temperature to allow them to be converted subsequently into containers.

The infrared radiation lamps are, for example, superposed in a rack forming a heating module, heating modules being arranged side by side, one after the other, in the direction of travel of the preforms in the oven 10, in this case longitudinally along the outward and return sections of the heating path, with the exception of the stabilizing section adjacent to the closed front side 14 and the open rear side 12 for the entry and exit of the preforms.

Moreover, the heating area 16b comprises a series of ventilation means such as centrifugal fans 24 (only one of which is shown in FIG. 2) which are arranged at the center of the oven 10, opposite the infrared radiation lamps, such that the preforms travel between the lamps and the centrifugal fans 24.

Each centrifugal fan 24 is associated with a distributor 26 for the main flow of air A, the distributor 26 being interposed transversely between the heating means 22.

According to FIG. 2, the centrifugal fans 24 are driven in rotation by a driving means, in this case a first motor 27, by means of which each centrifugal fan 24 draws air in through an upstream air inlet 28 of the distributor 26 and blows or projects the air thus drawn in as a whole in a transverse direction onto the preforms and the heating means 22, through two opposite lateral outlets 30a, 30b which are each arranged facing the heating means 22.

The drawn-in filtered air is preferably blown by the centrifugal fans 24 through the perforated reflectors which comprise, for example, vertical orientation slots forming the said lateral outlets 30a, 30b.

The reflectors are arranged transversely opposite the heating means 22 and are intended to reflect the infrared radiation in order to increase the efficiency of the heating, whilst at the same time allowing the passage of the cooling air.

The centrifugal fans 24 thus stir the air which is situated in the vicinity of the heating means 22 and the preforms so as in particular to prevent the outer surface of the body of the preforms from being burnt and to homogenize the heating of the body of the preforms.

The centrifugal fans 24 also create an elevated pressure in the heating area 16b in the vicinity of the preforms.

The first motor 27 interacts with a first control means 29 in order to vary the rotational speed of the centrifugal fans 24 and consequently vary the flow rate of air blown onto the preforms.

The heating area 16b advantageously comprises means (not shown) for thermal protection of the neck of the preforms in order to prevent them from being deformed by heating.

Lastly, the air extraction area 16c comprises at least one air extraction duct 42 through which the main flow of air A flows from the inside of the oven 10 to the outside of the oven 10.

The downstream end of the extraction duct 42 is, for example, connected to an evacuation circuit which guides the air extracted from the oven 10 into a heating circuit of the premises, or to outside the premises in which the oven 10 is situated.

The air extraction duct 42 comprises an associated extraction means 44, for example a fan 44, capable of creating a reduced pressure upstream of the fan 44 in the extraction duct 42 so as to extract the air to the outside of the oven 10, in the direction of the arrows shown in FIG. 2.

The term reduced pressure here means a pressure lower than the atmospheric pressure which prevails outside the oven 10.

According to another aspect, the air extraction area 16c is insulated from the outside of the oven 10 by means of a confining housing 46.

The confining housing 46 advantageously constitutes a first so-called upper part of the housing 32.

As illustrated in FIGS. 1 and 2, the confining housing 46 extends from the downstream opening 50 of the heating area 16b to the extraction duct 42 so as to insulate at least the heating area 16b with respect to the outside of the oven 10, in order to prevent the pollution of the inside of the oven 10 by airborne polluting particles.

Compared with the previously known ovens, the confining housing 46 completely closes the upper opening 50 which existed beforehand between the heating area 16b and the extraction duct 42, if the empty space above the heating area 16b remains, it is henceforth closed by the confining housing 46 which, in the manner of a lid, insulates it from the outside of the oven 10.

The confining housing 46 comprises at least one extraction hood 52 which has a widened shape toward the heating area 16b and hence a cross section that decreases in an upward direction.

The confining housing 46 extends vertically upward from a lower rectangular base 53.

The lower base 53 of the hood 52 of the confining housing 46 comprises two opposite longitudinal edges which are overall rectilinear and are connected to an upper edge of the side walls 32a, 32b respectively of the oven 10.

In a complementary fashion, according to FIG. 1, the confining housing 46 also comprises a first upper horizontal plate 48a and a second upper horizontal plate 48b which are attached to a first transverse edge and to a second transverse edge of the base 53 of the hood 52 so as to delimit the heating area 16b of the oven 10 vertically.

The first plate 48a and the second plate 48b are here each equipped with a manhole cover (not shown) to access the inside of the oven 10 from the top of the oven 10, for example to carry out maintenance work.

The hood 52 of the confining housing 46 preferably extends longitudinally above the outward and return sections of the heating path along which the heating means 22 are arranged, whilst the first plate 48a and the second plate 48b are respectively arranged above the first rear side 12 and the second front side 14.

As illustrated in FIG. 1, the first plate 48a and the second plate 48b form a ceiling which, along with the hood 52, makes it possible to close the inside of the oven 10 completely, each of the plates 48a, 48b interacting with the lower part of the housing 32 formed by the vertical walls 32a, 32b.

The confining housing 46 is thus able to collect the main flow of air A which flows from the heating area 16b in order to extract the main flow of air A to the outside via the extraction duct 42.

Starting from the assumption that the oven 10 is not perfectly airtight, and that the extraction fan 44 creates a reduced pressure inside the oven 10, there is a risk of parasitic currents of air penetrating into the oven 10, in particular around the doors 34.

Now such parasitic currents of air, which are not filtered, constitute potential vectors for polluting particles which thus risk being carried by the air in the vicinity of the preforms and consequently polluting in particular the said preforms.

To prevent such air currents, the quality of which is not controlled, from penetrating inside the oven 10, the confining housing 46 delimits secondary or auxiliary air inlet apertures 54 which are arranged downstream of the heating area 16b such that a secondary so-called bleed flow of air B flows through the air inlet apertures 54 under the effect of the reduced pressure created by the extraction fan 44.

The secondary flow of air B thus flows from the outside of the oven 10 directly to the air extraction duct 42 without passing through the main heating area 16b.

More particularly, each secondary air inlet aperture 54 comprises a plurality of orifices 56 which are aligned longitudinally on either side of the hood 52, in the vicinity of the junction of the base 53 of the hood 52 with the side walls 32a, 32b.

Such a design promotes the inlet of air through the air inlet aperture 54 rather than through an uncontrolled parasitic inlet of air without risking polluting the preforms or the internal members of the oven 10.

The air extraction flow rate through the extraction duct 42 is advantageously greater than the flow rate of filtered air that is drawn in and ventilated by the centrifugal fans 24 so as to evacuate all of the ventilated cooling air and to guarantee that the air penetrating parasitically inside the oven 10 owing to the reduced pressure existing downstream of the extraction duct 42 penetrates exclusively through the said secondary air inlet apertures 54.

Thus the secondary flow of air B which penetrates through the orifices 56 of an air inlet aperture 54 never circulates in the heating area 16b which is maintained permanently at an elevated pressure in order to prevent any penetration of polluting particles.

According to another aspect, the air extraction fan 44 is driven in rotation by means of a second motor 58 which, depending on its operating mode, varies the rotational speed of the fan 44 and consequently varies the reduced pressure downstream of the fan 44 and the flow rate of air extracted by the fan 44 through the extraction duct 42.

To this end, the oven 10 comprises a second means 60 for controlling the air extraction fan 44, which interacts with the second motor 58 so as to vary its operating mode.

Moreover, the oven 10 comprises a first means 62 for measuring the reduced pressure inside the air extraction area 16c, upstream of the extraction fan 44.

As can be seen in FIG. 2, the means 62 for measuring the reduced pressure is here a means for measuring differential pressure, or transmitting differential pressure, for example a piezoresistive pressure sensor.

The means 62 for measuring the reduced pressure measures the difference in pressure between the outside of the oven 10 and a point situated inside the confining housing 46, upstream of the extraction fan 44 and downstream of the associated secondary air inlet aperture 54.

The second control means 60 controls the air extraction fan 44 depending on the value of the differential pressure measured by the measuring means 62 and on a reference value for the reduced pressure so as to regulate the flow rate of air extracted by the extraction fan 44 according to the associated reference value.

The control means 60 thus makes it possible to obtain a constant flow rate of air, depending on the reference value for the reduced pressure, independently of the state of the air inlet 20 of the intake duct 18, in particular of the amount of dirt accumulated in the filter means 21, 23.

The reference value for the reduced pressure is predetermined so as to create a reduced pressure inside the confining housing 46, by virtue of which the flow rate of air extracted through the extraction duct 42 is greater than the flow rate of air blown onto the preforms by the centrifugal fans 24, independently of the flow rate of air blown onto the preforms by the centrifugal fans 24.

The control means 60 thus constitutes a means for servo-controlling the centrifugal fans 24 and the extraction fan 44.

The reference value for the reduced pressure lies, for example, between 0 and 100 Pascals.

The oven 10 operates in a so-called production mode in which the heating means 22 are activated, or in a so-called out-of-production mode in which the heating means 22 are deactivated.

The production mode corresponds to a normal operation of heating the preforms, and the out-of-production mode corresponds to all other operating states of the oven 10, for example a monitoring mode of the oven 10 or a maintenance mode.

The centrifugal fans 24 and the extraction fan 44 are permanently driven in rotation, irrespective of the mode in which the oven 10 is operating, by virtue of which the oven 10 is traversed permanently by the main flow of air A.

Thus, only filtered air flows through the heating area 16b, thus preventing the deposition of polluting particles on the preforms or internal members of the oven 10.

Moreover, the centrifugal fans 24 are controlled by the associated control means 29 such that the flow rate of air which is blown by the centrifugal fans 24 is lower in the out-of-production mode than in the production mode of the oven 10.

Similarly, the reference value for the reduced pressure varies depending on the mode in which the oven is operating, the reference value for the reduced pressure being lower when the oven 10 operates in out-of-production mode.

More particularly, when the oven 10 is operating in its out-of-production mode, the reference value for the reduced pressure is determined in such a way that the flow rate of air extracted by the extraction fan 44 is sufficient to extract the excess heat in the oven 10.

Similarly, when the oven 10 operates in its out-of-production mode, the first reference value for the reduced pressure is determined in such a way that the flow rate of the flow of air extracted by the extraction fan 44 is sufficient to prevent any polluting particles from being deposited on the preforms or on an internal member of the oven 10, in particular the polluting particles which are drawn in through the secondary air inlet aperture 54.

According to another aspect, the air intake area 16a comprises means 70, 72 for detecting the accumulation of dirt in the filtering means 21, 23.

The means for detecting the accumulation of dirt comprise a second means 70 for measuring the reduced pressure, similar to the above-described first detection means 62.

The second measuring means 70, illustrated in FIG. 2, measures the difference in pressure between the outside of the oven 10 and a space which is situated between the first upstream filter 21 and the second downstream filter 23 of the air inlet 20.

The second measuring means 70 is thus capable of measuring the degree of accumulation of dirt, or clogging, of the upstream filter 21 by comparing the reduced pressure measured and a predetermined reference value.

Similarly, the means for detecting the accumulation of dirt comprise a third measuring means 72 which measures the difference in pressure between a space which is situated between the first upstream filter 21 and the second downstream filter 23, and a space which is situated directly downstream of the second downstream filter 23 of the air inlet 20.

The third measuring means 72 is thus capable of measuring the degree of accumulation of dirt, or clogging, of the second downstream filter 23 by comparing the reduced pressure measured and a predetermined reference value.

According to an alternative embodiment which is not shown, the oven 10 comprises a first means for measuring the flow rate of air which is arranged in the extraction duct 42, and a second means for measuring the flow rate of air which is arranged in the intake duct 18.

According to this alternative, the first and the second means for measuring the flow rate of air each interact with the second means 60 for controlling the extraction fan 44, such that the flow rate of air which is extracted through the extraction duct 42 is greater than the flow rate of drawn-in air blown by the centrifugal fans 24.

Lastly, in order to guarantee a high degree of hygiene and cleanliness of the preforms, the oven 10 comprises sterilization or disinfecting means (not shown) which are capable of emitting ultraviolet rays so as to irradiate internal members of the oven which are likely to be in contact with the preform, for example the turntables which interact with the inner wall of the neck of the preforms.

The preforms are advantageously sterilized by means of a sterilizing agent such as hydrogen peroxide deposited by condensation inside the preform, which agent evaporates when it is subjected to the heating means of the oven 10, and is then drawn in by the hood 52.

The invention also relates, with no limitation being implied, to an oven 10 which does not comprise an extraction fan 44 and/or does not comprise a centrifugal fan 24 for blowing air onto the preforms, the oven 10 then being traversed from upstream to downstream by a main flow of air which flows vertically to the extraction duct 42 by convection.

Similarly, the invention is in no way limited to an oven with an overall parallelepipedal shape, such as that described above.

The invention also applies to a curved, circular or annular oven, or one with any other shape.

The invention claimed is:

1. An oven (10) for the thermal conditioning of preforms made of a thermoplastic material which comprises at least one cooling circuit (16) using the circulation of a main flow of cooling air (A) which, from the upstream side to the downstream side, sequentially traverses inside the oven (10) at least:
   one cooling air intake area (16a), which comprises at least one air intake duct (18) through which the said main flow of cooling air (A) can flow, from the outside of the oven (10) to the inside of the oven (10),
   one heating area (16b) which is supplied with air by the intake duct (18) and which comprises means (22) for heating the preforms, and
   one air extraction area (16c) into which at least one air extraction duct (42) opens,
   the oven (10) comprises a confining housing (46) that extends from the air extraction duct (42) to at least the heating area (16b) and is capable of insulating at least the said heating area (16b) with respect to the outside of the oven (10) in order to prevent the pollution of the inside of the oven (10) by airborne polluting particles,
characterized in that the confining housing (46) comprises at least one so-called secondary air inlet opening (54) which is arranged downstream of the heating area (16b) in such a way that a secondary flow of air (B) flows from outside the oven (10), directly through the said secondary air inlet opening (54), to the air extraction duct (42).

2. The oven (10) as claimed in claim 1, characterized in that the air intake area (16a) comprises filtering means (21, 23) which are intended to filter the cooling air taken into the intake area (16a).

3. The oven (10) as claimed in claim 2, characterized in that the cooling air intake area (16a) comprises means (70, 72) for detecting the accumulation of dirt on the said filtering means (21, 23).

4. The oven (10) as claimed in claim 1, characterized in that the confining housing (46) comprises at least one so-called upper first part which has a widened shape in the direction of the heating area (16b) so as to collect the main flow of air (A).

5. The oven (10) as claimed in claim 4, characterized in that the confining housing (46) comprises at least one so-called lower second part which is connected to the first part and which extends around the oven (10) so as to insulate at least the heating area (16b) from the outside.

6. The oven (10) as claimed in claim 1, characterized in that the heating area (16b) comprises ventilation means (24) which can draw in the air coming from the intake duct (18) and blow the air drawn in in this way toward the preforms, creating an elevated pressure in the vicinity of the said preforms, such that only the air drawn in by the ventilation means (24) comes into contact with the preforms.

7. The oven (10) as claimed in claim 1, characterized in that the oven (10) comprises at least:
   an air extraction means (44) which is associated with the extraction duct (42) and which can create a suction reduced pressure in the extraction area (16c) upstream of the said extraction duct (42),
   a means (62) for measuring the reduced pressure inside the air extraction area (16c),
   a means (60) for controlling the air extraction means (44) as a function of parameters that include at least:
      the value of the reduced pressure measured inside the air extraction area (16c) by the said measuring means (62), and
      a predetermined reference value for the reduced pressure so as to create a reduced pressure inside the air extraction area (16c) such that the flow rate of air extracted through the extraction duct (42) is greater than the flow rate of the air blown toward the preforms by the ventilation means (24) in the heating area (16b).

8. The oven (10) as claimed in claim 7, characterized in that the oven (10) operates in a first so-called production mode in which the heating means (22) are activated, or in a second so-called out-of-production mode in which the heating means (22) are deactivated and in that, irrespective of the mode in which the oven (10) is operating, the oven (10) is traversed permanently by the main flow of air (A) in order to avoid the deposition of polluting particles inside the oven (10).

9. The oven (10) as claimed in claim 8, characterized in that the said predetermined reference value for the reduced pressure varies selectively as a function of the modes of the oven (10) so as to adapt the flow rate of the main flow of air (A) depending on whether the oven (10) is in the first or second mode.

10. The oven (10) as claimed in claim 2, characterized in that the confining housing (46) comprises at least one so-called upper first part which has a widened shape in the direction of the heating area (16b) so as to collect the main flow of air (A).

11. The oven (10) as claimed in claim 3, characterized in that the confining housing (46) comprises at least one so-called upper first part which has a widened shape in the direction of the heating area (16b) so as to collect the main flow of air (A).

12. The oven (10) as claimed in claim 2, characterized in that the heating area (16b) comprises ventilation means (24) which can draw in the air coming from the intake duct (18) and blow the air drawn in in this way toward the preforms, creating an elevated pressure in the vicinity of the said preforms, such that only the air drawn in by the ventilation means (24) comes into contact with the preforms.

13. The oven (10) as claimed in claim 3, characterized in that the heating area (16b) comprises ventilation means (24) which can draw in the air coming from the intake duct (18) and blow the air drawn in in this way toward the preforms, creating an elevated pressure in the vicinity of the said preforms, such that only the air drawn in by the ventilation means (24) comes into contact with the preforms.

14. The oven (10) as claimed in claim 2, characterized in that the oven (10) comprises at least:
   an air extraction means (44) which is associated with the extraction duct (42) and which can create a suction reduced pressure in the extraction area (16c) upstream of the said extraction duct (42),
   a means (62) for measuring the reduced pressure inside the air extraction area (16c),
   a means (60) for controlling the air extraction means (44) as a function of parameters that include at least:
      the value of the reduced pressure measured inside the air extraction area (16c) by the said measuring means (62), and
      a predetermined reference value for the reduced pressure so as to create a reduced pressure inside the air extraction area (16c) such that the flow rate of air extracted through the extraction duct (42) is greater than the flow rate of the air blown toward the preforms by the ventilation means (24) in the heating area (16b).

15. The oven (10) as claimed in claim 3, characterized in that the oven (10) comprises at least:
   an air extraction means (44) which is associated with the extraction duct (42) and which can create a suction reduced pressure in the extraction area (16c) upstream of the said extraction duct (42),
   a means (62) for measuring the reduced pressure inside the air extraction area (16c),
   a means (60) for controlling the air extraction means (44) as a function of parameters that include at least:
      the value of the reduced pressure measured inside the air extraction area (16c) by the said measuring means (62), and
      a predetermined reference value for the reduced pressure so as to create a reduced pressure inside the air extraction area (16c) such that the flow rate of air extracted through the extraction duct (42) is greater than the flow rate of the air blown toward the preforms by the ventilation means (24) in the heating area (16b).

16. The oven (10) as claimed in claim 1, characterized in that the oven (10) operates in a first so-called production mode in which the heating means (22) are activated, or in a second so-called out-of-production mode in which the heating means (22) are deactivated and in that, irrespective of the mode in which the oven (10) is operating, the oven (10) is traversed permanently by the main flow of air (A) in order to avoid the deposition of polluting particles inside the oven (10).

* * * * *